(12) United States Patent
Chen et al.

(10) Patent No.: US 11,646,480 B2
(45) Date of Patent: May 9, 2023

(54) TERAHERTZ HOLLOW CORE WAVEGUIDE

(71) Applicant: JIANGSU UNIVERSITY, Zhenjiang (CN)

(72) Inventors: Mingyang Chen, Zhenjiang (CN); Tongtong Bai, Zhenjiang (CN); Zhao Wang, Zhenjiang (CN); Hang Xu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/623,890

(22) PCT Filed: Dec. 15, 2020

(86) PCT No.: PCT/CN2020/136484
§ 371 (c)(1),
(2) Date: Dec. 30, 2021

(87) PCT Pub. No.: WO2022/116266
PCT Pub. Date: Jun. 9, 2022

(65) Prior Publication Data
US 2022/0365272 A1    Nov. 17, 2022

(30) Foreign Application Priority Data

Dec. 4, 2020  (CN) .......................... 202011404648.7

(51) Int. Cl.
*H01P 3/127*   (2006.01)
*H01P 3/12*    (2006.01)
(Continued)

(52) U.S. Cl.
CPC .......... *H01P 3/127* (2013.01); *G02B 6/02304* (2013.01); *H01P 3/12* (2013.01); *G02B 6/02366* (2013.01); *G02B 6/032* (2013.01)

(58) Field of Classification Search
CPC ....... G02B 6/02304; H01P 3/12; H01P 3/127; H01P 1/042
See application file for complete search history.

(56) References Cited

U.S. PATENT DOCUMENTS 6,418,258 B1 *  7/2002  Wang ................. G02B 6/02376
                                                  385/124
7,209,619 B2 *  4/2007  Dong ................. G02B 6/02357
                                                  385/127
(Continued)

FOREIGN PATENT DOCUMENTS

CN        1760704 A       4/2006
CN        1963574 A       5/2007
(Continued)

OTHER PUBLICATIONS

M. Chen et al. Optical and mechanical properties of hollow-core fibers with cobweb cladding structure. Chinese Optics Letters, 4:2: 63-65, Feb. 10, 2006. (Year: 2006).*
(Continued)

*Primary Examiner* — Michael Stahl
(74) *Attorney, Agent, or Firm* — Bayramoglu Law Offices LLC

(57) ABSTRACT

A terahertz hollow core waveguide includes several successively cascaded waveguide units, and the waveguide units includes fiber core and cladding. The fiber core is composed of air, and the cladding is composed of dielectric rings, air rings, support strips, and an outer cladding. The medium rings and the air rings are successively surrounded on the outside of the fiber core, and the outer cladding is surrounded on the outside of the outermost air ring. All support strips in the same air ring of the same waveguide unit form a support strip group, and the support strips in the support strip group are arranged along the circumferential direction to connect two adjacent dielectric rings in the same wave- (Continued)

guide unit or to connect the outermost dielectric ring and the outer cladding in the same waveguide unit.

10 Claims, 12 Drawing Sheets

(51) Int. Cl.
*G02B 6/02* (2006.01)
*G02B 6/032* (2006.01)

(56) References Cited

U.S. PATENT DOCUMENTS

| | | | |
|---|---|---|---|
| 2005/0226579 A1* | 10/2005 | Fink | G02B 6/02328 385/124 |
| 2005/0232560 A1* | 10/2005 | Knight | C03B 37/0122 385/125 |
| 2020/0241200 A1* | 7/2020 | Wang | G02B 6/02328 |
| 2020/0257041 A1* | 8/2020 | Xu | C03B 37/02781 |

FOREIGN PATENT DOCUMENTS

| | | |
|---|---|---|
| CN | 103645534 A | 3/2014 |
| CN | 109946784 A | 6/2019 |
| CN | 110289471 A | 9/2019 |
| JP | 2015188147 A | 10/2015 |

OTHER PUBLICATIONS

A. Hassani et al. Porous polymer fibers for low-loss terahertz guiding. Optics Express, 16:9:6340-6351, Apr. 28, 2008. (Year: 2008).*

G. Vienne et al. Ultra-large bandwidth hollow-core guiding in all-silica Bragg fibers with nano-supports. Optics Express, 12:15:3500-3508, Jul. 26, 2004. (Year: 2004).*

R-J. Yu et al. Proposal for ultralow loss hollow-core plastic Bragg fiber with cobweb-structured cladding for terahertz waveguiding. IEEE Photonics Technology Letters, 19:12:910-912, Jun. 15, 2007 (Year: 2007).*

* cited by examiner

TERAHERTZ HOLLOW CORE WAVEGUIDE

CROSS REFERENCE TO THE RELATED APPLICATIONS

This application is the national phase entry of International Application No. PCT/CN2020/136484, filed on Dec. 15, 2020, which is based upon and claims priority to Chinese Patent Application No. 202011404648.7, filed on Dec. 4, 2020, the entire contents of which are incorporated herein by reference.

TECHNICAL FIELD

The present invention relates to the terahertz optical band and terahertz transmission system, in particular to a terahertz hollow core waveguide.

BACKGROUND

Terahertz wave has a special position in the electromagnetic spectrum, and it has shown the special characteristics of superior performance, high transmission, low energy, water absorption, transient, coherence, etc., so that the terahertz technology has important application prospects in various research fields. However, most waveguide materials have high absorption loss for terahertz wave transmission. It is difficult to find waveguide materials with low absorption loss in terahertz band, and the external environment has a great impact on terahertz wave. The almost ideal way is to isolate terahertz waveguides from the outside environment, but in practice, it is difficult to achieve complete isolation.

The Bragg structure of one-dimensional photonic crystal has strong confinement ability to mode fields. Due to the low loss of terahertz wave in air, the Bragg waveguide structure is usually composed of dielectric rings and air rings arranged radially along the waveguide. However, corresponding supporting structures must be used in the air rings to form stable mechanical structure. At present, there are several kinds of hollow core Bragg waveguides. 1. "Swiss Roll" waveguide structure; 2. The annular hole waveguide structure, which arranges a series of air holes equally spaced along the radial direction of the waveguide in a circular manner in the cladding, so as to form an effectively low refractive index ring of the Bragg cladding, but the effectively Bragg structures weaken the confinement ability of the Bragg cladding of the guided wave. 3. The hollow core Bragg waveguide with a spider mesh structure, which has difficulties in fabrication because the cladding wall thickness of the waveguide structure is very thin and the core air hole is large, and the structural loss caused by the support strips cannot be ignored.

It can be seen that the main problem that the terahertz Bragg waveguide to be solved would be how to ensure the stability of the waveguide structure and how to effectively reduce the impact of the support units on the transmission loss of the waveguide.

SUMMARY

In view of the deficiencies in the prior art, the present invention provides a terahertz hollow core waveguide, the configuration of which reduces the impact of the support strip on waveguide transmission loss by the introduction of segmented support strips.

The present invention realizes the above technical purpose through the following technical means.

Herein presents a terahertz hollow core waveguide, wherein the terahertz hollow core waveguide is composed of cascaded waveguide units, and each waveguide unit includes a core and a cladding, the core is composed of air, the cladding includes dielectric rings, air rings, an outer cladding, and one or more support strip groups. The dielectric rings and the air rings are alternately arranged around the core, and the outer cladding is arranged on the outside of the outermost air ring.

There should be at least one support strip group in each air ring of the terahertz hollow core waveguide. All support strips in an air ring of a waveguide unit form a support strip group, and the support strips in a support strip group are arranged along the circumferential direction to connect two adjacent dielectric rings in the waveguide unit or to connect the outermost dielectric ring and the outer cladding in the waveguide unit. For any two adjacent waveguide units, at least one of the waveguide units does not have support strips in at least one of the air rings.

Preferably, the air rings, the dielectric rings and the outer cladding are concentric rings, all the air rings have the same width, and all the dielectric rings have the same width.

Preferably, for arbitrarily two adjacent air rings in a waveguide unit, at most one air ring is provided with a support strip group.

Preferably, the number of dielectric rings N should meet the condition of $2 \leq N \leq 6$.

Preferably, the width $d_{s,n}$ of a support strip in the nth air ring should meet the conditions of $d_{s,n} \geq d_{m,n}$, $M_n d_{s,n} < 2\pi d_{r,n}/4$, and $1 \leq M_n \leq N$, where n denotes the order number of air ring from inside to outside along the radial direction of the waveguide, $M_n$ denotes the number of support strips located on the same cross section of the waveguide, $d_{m,n}$ is the width of the dielectric ring in the nth ring, $d_{r,n}$ is the outer diameter of the nth dielectric ring.

Preferably, at most one air ring of each waveguide unit is arranged with a support strip group.

Preferably, the support strip groups are periodically arranged along the axial direction of the waveguide, for each period, the support strip groups are arranged in order, firstly in the first air ring, then in the second air ring, etc., and until up to the N-th air ring, wherein the air ring adjacent to the core is denoted as the first air ring and the other air rings are named according to the order of the air rings arranged radially along the waveguide, where N is the number of air rings.

Preferably, the support strip groups are periodically arranged along the axial direction of the waveguide, and the support strip groups in a period are successively arranged in order, firstly in the first air ring, then in the second air ring, etc., and until up to the N-th air ring, and then arranged in order from the (N−1)-th air ring and until up to the second air ring.

Preferably, the support strips in the same air ring are evenly distributed along the circumferential direction in the waveguide unit.

Preferably, the lengths $L_{s,n}$ of the support strips in the nth air ring in a waveguide unit should meet the condition of $d_{a,n} < L_{s,n} < 100 d_{m,n}$ wherein $d_{m,n}$ is the width of the nth dielectric ring and $d_{a,n}$ is the width of the nth air ring.

The advantages of the present invention are as follows.

1. In the terahertz hollow core waveguide of the present invention, the support strips are not continually distributed along the axial direction of the waveguide, in fact, the segmented support strips are adopted along the axial direction of the waveguide, which effectively decreases the destruction of the support strips to the band gap of the cladding structure, decreases the transmission loss caused by the support strips, and at the same time ensures the mechanical stability of the structure through reasonable support strip arrangement.

2. The terahertz hollow core waveguide of the present invention can be arranged with periodic support strips along the axial direction of the waveguide, so as to ensure that the support strips form stable and regular mechanical support for the dielectric rings and ensure the stability of the structure.

3. The terahertz hollow core waveguide of the present invention is equivalent to the cascaded arrangement of a plurality of hollow core waveguide units with only a part of air rings arranged with support strips, or the cascaded arrangement of a plurality of hollow core waveguide units without support strip and hollow core waveguide units with only a part of air layers arranged with support strips. The single waveguide unit cannot form a stable mechanical structure due to the lack of sufficient support. By effectively arranging and cascading these waveguide units, the support strips can not only support the dielectric rings and outer cladding of the waveguide unit, but also effectively support the dielectric rings and outer cladding of the other waveguide units, so as to form a stable structure of the whole waveguide. Therefore, the structure of the present invention not only ensures the stability of the waveguide structure, but also can obtain low loss transmission similar to the hollow core waveguide without support strips.

BRIEF DESCRIPTION OF THE DRAWINGS

FIG. 3A shows support strips in the innermost air ring, FIG. 3B shows support strips in the second air ring, and FIG. 3C shows support strips in the outermost air ring.

FIG. 4A shows that the width of the support strips in the waveguide unit varies along the axial direction, and FIG. 4B shows that a part of the waveguide unit is without support strips.

FIG. 5A shows the confinement losses of a waveguide with conventional support strips, and the ideal waveguide structure without support strips, FIG. 5B shows the confinement losses of the waveguide with the support strips arranged in different air rings, and FIG. 5C shows the confinement losses of the waveguide with support strips arranged in adjacent two air rings.

FIG. 7A shows arrangement of support strips without interval along the axial direction, FIG. 7B shows arrangement of support strips with interval along the axial direction, and FIG. 7C shows supporting strips arranged in the shape of arch bridge.

FIG. 8A shows support strips arranged in the inner air ring, FIG. 8B shows support strips arranged in the second air ring, and FIG. 8C shows support strips arranged in the outermost air ring.

DETAILED DESCRIPTION OF THE EMBODIMENTS

Embodiments of the present invention are described in detail below, examples of which are shown in the accompanying drawings, in which the same or similar labels from beginning to end indicate the same or similar elements or elements with the same or similar functions. The embodiments described below by reference to the accompanying drawings are illustrative and are intended to be used for the interpretation of the present invention and cannot be understood as a limitation of the present invention.

In the description of the present invention, it is to be understood that the terms "center", "longitudinal", "transverse", "length", "width", "thickness", "up", "down", "axial", "radial", "vertical", "horizontal", "inner", "outer" and the like refer to the orientation or position relationship shown in the attached drawings are used for the description of the present invention and the simplified description, rather than indicating or implying that the device or element in question must have a specific orientation, be constructed and operated in a specific orientation, and therefore cannot be understood as a limitation of the present invention. In addition, the terms "first" and "second" are used only for the purpose of description and cannot be understood as indicating or implying relative importance or implicitly indicating the number of technical features indicated. Thus, the features defined as "first" and "second" may explicitly or implicitly include one or more of the features. In the description of the present invention, "multiple" means two or more, unless otherwise specifically defined.

In the present invention, unless otherwise specified and limited, the terms "installation", "interconnection", "connection", "fixation" and other terms shall be understood in a broad sense. For example, it can be fixed connection, removable connection, or integrated connection. It can be connected directly or indirectly through an intermediate medium, and it can be the connection between the two elements. For those skilled in the art, the specific meaning of the above terms in the present invention can be understood according to the specific situation. Firstly, in the following, the specific implementation requirements and related embodiments of the terahertz hollow core waveguide described in the present invention are described in combination with the accompanying drawings.

Figure 1:
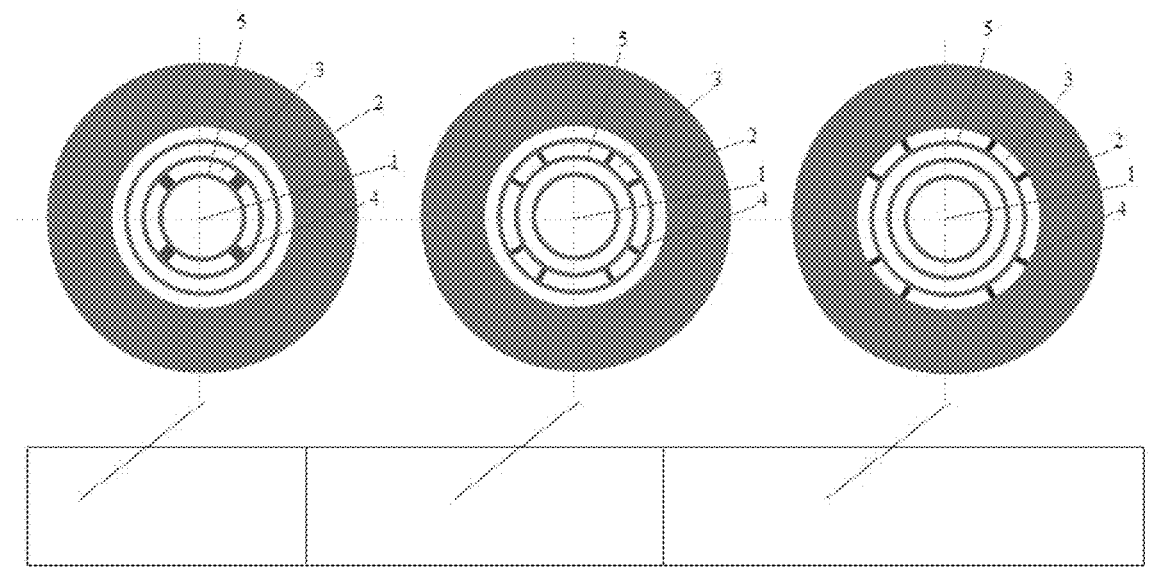
FIG. 1 is a schematic diagram of the cross-sectional refractive index distribution of the waveguide units of the terahertz hollow core waveguide and the illustration of cascaded waveguide units.
Figure 2A:
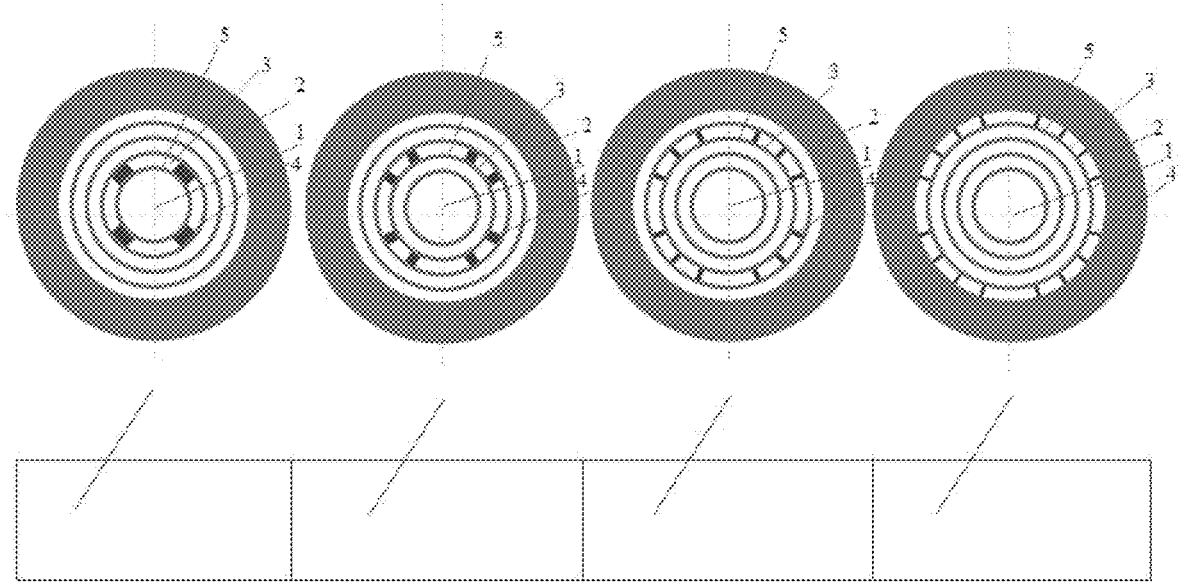
FIGS. 2A-2D show the cross section refractive index distribution and the illustration of cascaded waveguide units for the terahertz hollow core waveguide of the present invention.
Figure 2B:
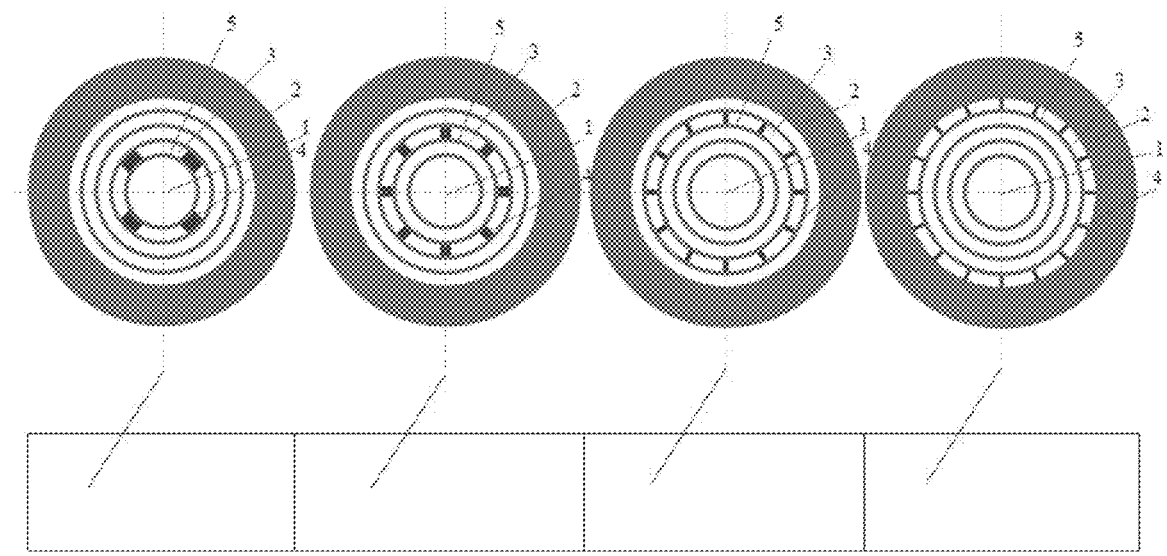
Figure 2C:
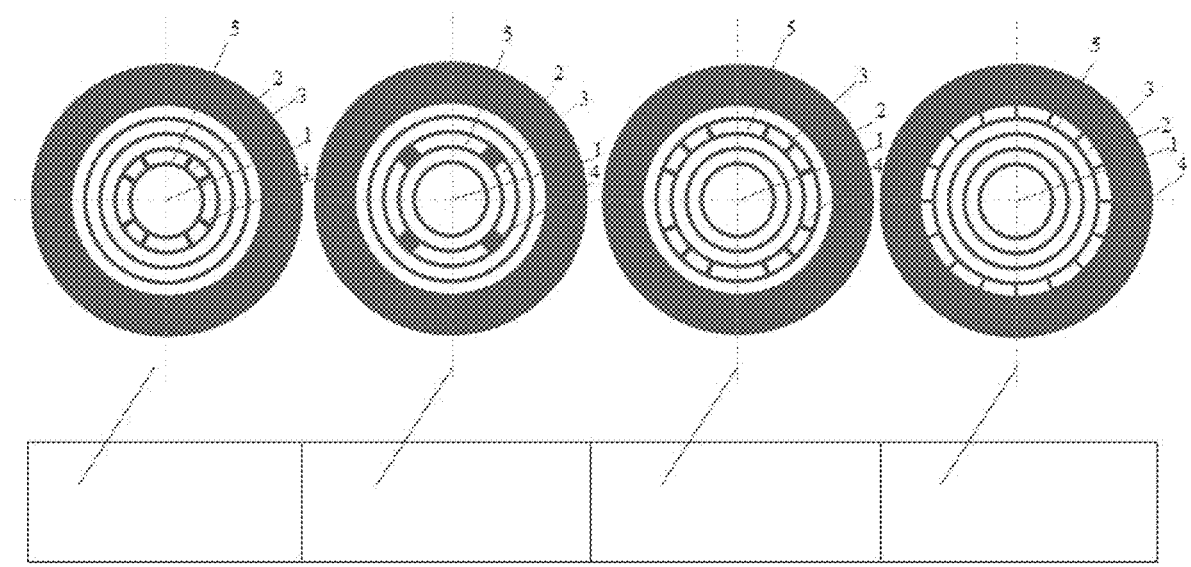
Figure 2D:
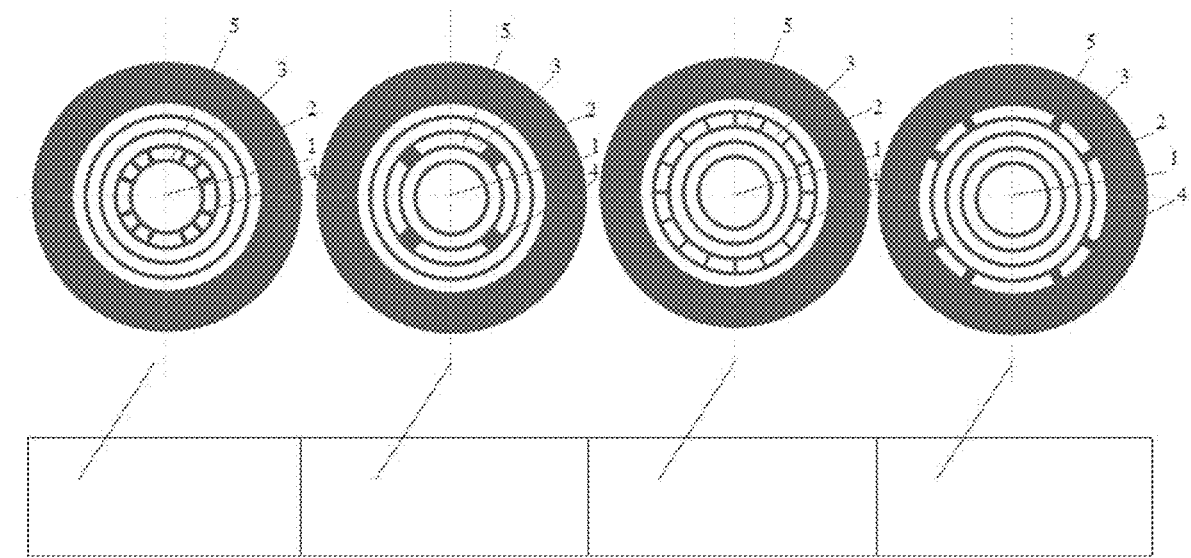

FIG. 1 shows a terahertz hollow core waveguide according to an embodiment of the present invention, which is composed of several cascaded waveguide units, wherein a waveguide unit includes core and cladding.

Specifically, the core 1 is composed of air. The cladding includes an outer cladding 2, at least one dielectric ring 5 and at least one air ring 3. The cladding can also include one or more support strip groups. The dielectric ring 5 and the air ring 3 are surrounded outside the core 1. The number of the dielectric ring 5 and the air ring 3 is the same. The outer cladding is surrounded outside the outermost air ring 3. The air ring 3, the dielectric ring 5 and the outer cladding 2 forming concentric ring structures. All support strips in one air ring of a waveguide unit form a support strip group, and the number of support strips in each support strip group should not be less than 2. The difference between different waveguide units is mainly the formation, quantity and arrangement of support strips, while the structural parameters of air ring 3, dielectric ring 5, core 1 and outer cladding 2 are the same. As shown in FIG. 1, there is a support strip in the innermost air ring of the left waveguide unit, which supports mechanically not only the first and second dielectric rings 5 of the waveguide unit, but also the first and second dielectric rings 5 of the middle and right waveguide units. Similarly, the support strip 4 in the intermediate waveguide unit supports the second and third dielectric rings 5 of all the waveguide units, while the rightmost waveguide unit supports the third dielectric ring 5 and the outer cladding 2. For any two adjacent waveguide units, there is at least one air ring 3 of a waveguide unit, where there is no support strip 4 arranged, that is, the support strips 4 do not penetrate the whole waveguide but is selectively distributed in the axial direction of the waveguide. Owing to the discontinuous arrangement, the influence of support strips 4 on the band gap of terahertz hollow core waveguide decreases, so as to effectively reduce the influence of support strips on the confinement losses of terahertz hollow core waveguide. For the condition of both of the two adjacent air rings 3 have support strip groups, the confinement losses will increase significantly. Therefore, a better scheme is that at most one of the two adjacent air rings 3 in any cross section has a support strip group. For the purpose of mechanical support, there should be at least one support strip group in any air ring of the terahertz hollow core waveguide so as to support the two adjacent dielectric rings, or the outermost dielectric ring and the outer cladding. The support strip group is composed of support strips 4 distributed along the circumferential direction. As units for mechanical stability, the support strips 4 are used to connect two adjacent dielectric rings 5 or to connect the outermost dielectric rings 5 and the outer cladding 2 to form mechanical support for the dielectric rings 5 and the outer cladding. The cross-section of the support strip 4 can be rectangle, and its two ends overlap with some areas of the dielectric ring 5. Theoretically, a more complex form of support strip 4 can also be used, only that the ends of the support strip 4 should be connected to the dielectric ring 5 or outer cladding 2 to achieve stable mechanical support.

FIGS. 2A-2D show several possible arrangements of support strips 4 in the waveguide cross section. The support strip 2 can be evenly distributed along the axial direction in the air ring 3, or several support strips 4 can be combined as a unit, and then the units are uniform distributed. The waveguide units can be cascaded such that the support strip 4 in the waveguide units are located from the inner most to the outer most air rings. Other kinds of arrangement can also be applied. For the convenience of explanation, the air rings 3 of the waveguide of the present invention are named according to the following rules. The air ring 3 adjacent to the fiber core is named as the first air ring 3, and the order number of the other air rings 3 are sorted from the inner side to the outer side of the waveguide along the radial direction of the waveguide.

Figure 3A:
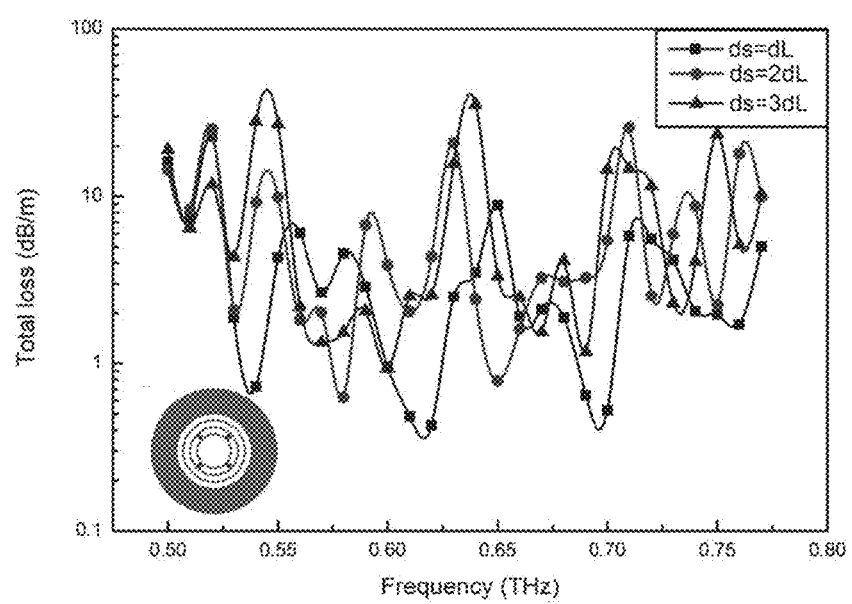
FIGS. 3A-3C show the transmission loss curves for the support strips at different air rings, where
Figure 3B:
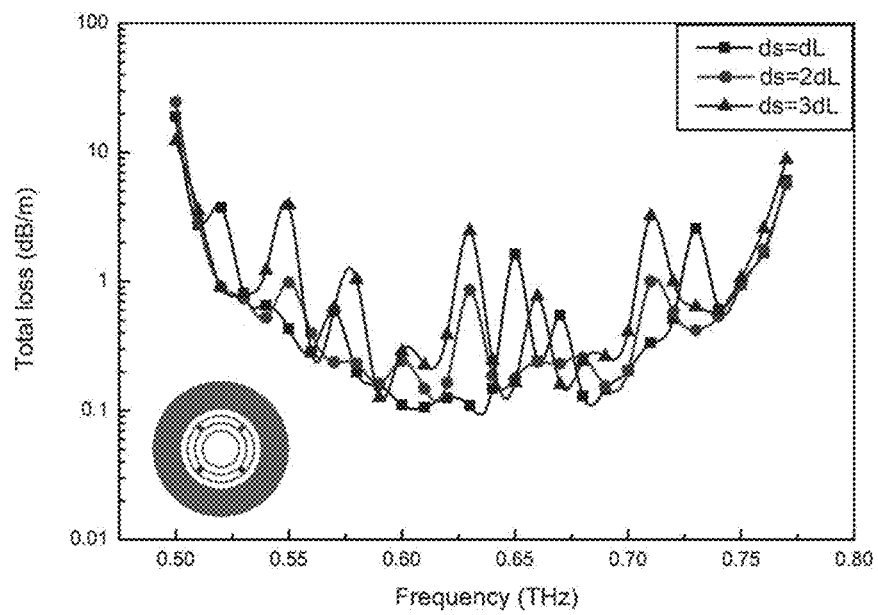
Figure 3C:
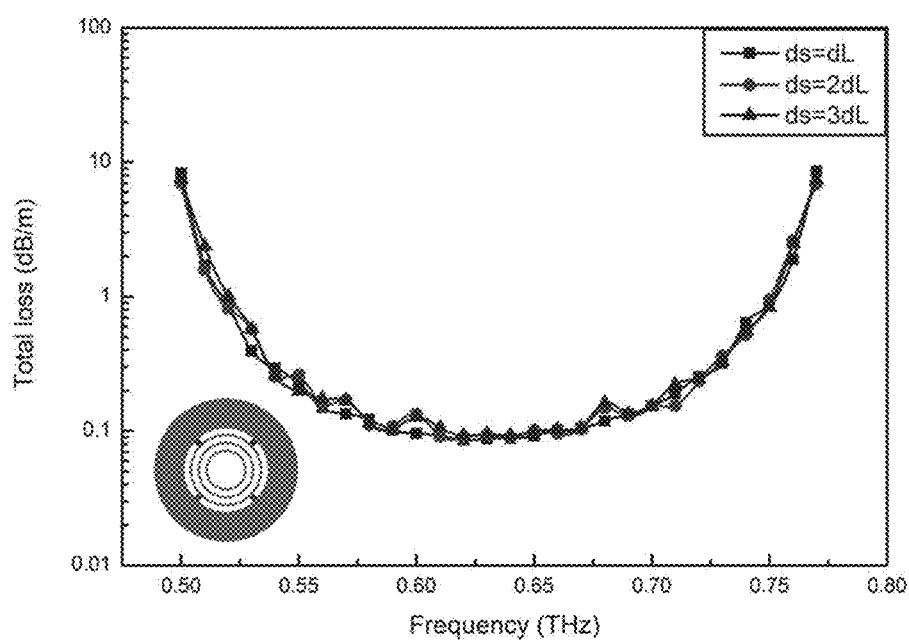
Figure 4A:
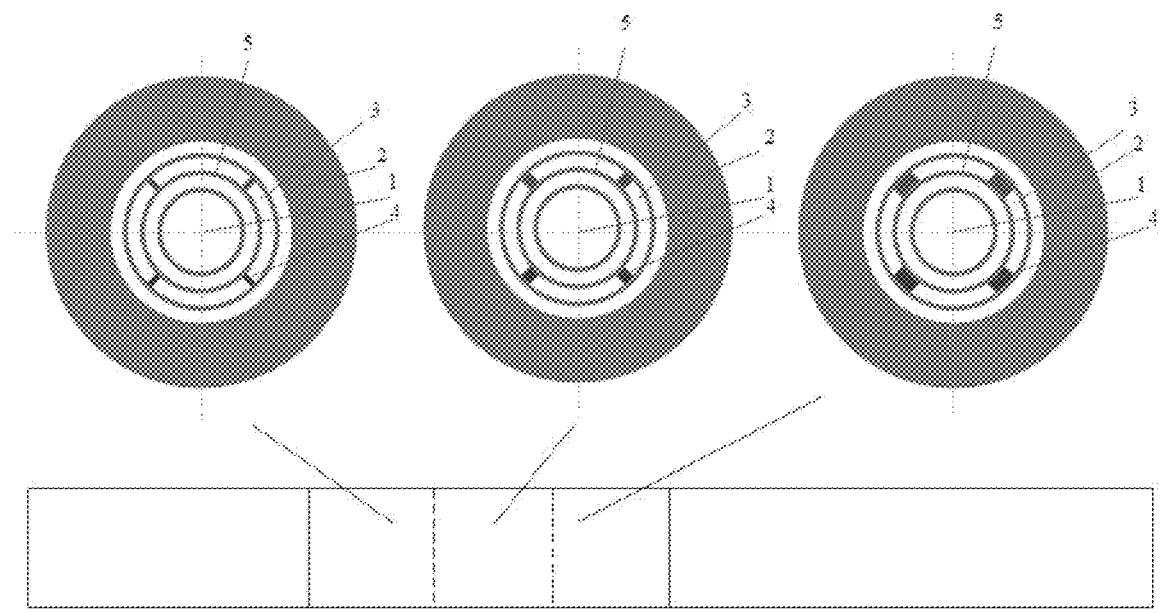
FIGS. 4A-4B are schematic diagrams of two kinds of distribution of support strips in a waveguide unit, where
Figure 4B:
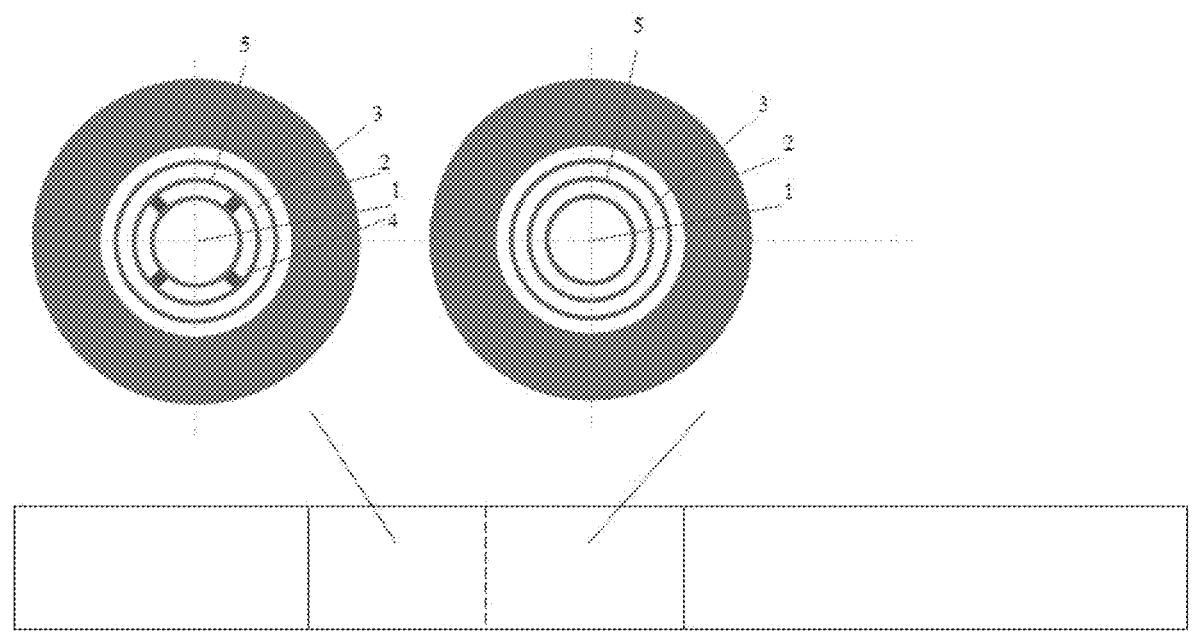

As shown in FIGS. 3A-3C, for the first and the second air ring 3, although the variation of the width of the support strip 4 causes large fluctuations of losses, the width of the support strip 4 has little impact on the magnitude of losses. Therefore, stable support can be realized by increasing the width of the support strips 4 and reducing the distribution length and numbers of the support strips 4 for the inner air rings 3 which is close to the core 1. In addition, the width of the support strip 4 can vary along the axial direction in a waveguide unit. As shown in FIG. 4A, there are support strips 4 in the second air layer 3 of the waveguide unit, and the width of the support strips 4 varied from narrow to wide along the axial direction. In addition, the support strips 4 in a waveguide unit may not axially arranged in the whole waveguide unit, that is, the length of the support strips 4 can be shorter than the length of the waveguide unit, that is, one part of the waveguide unit does not have any support strips 4 on the cross-section, and the part forms an ideal hollow core waveguide structure so as to realize low loss transmission, as shown in FIG. 4B.

For the whole waveguide, each air ring has support strips 4 to support the dielectric rings. By the reasonable parameter setting of support strips 4, such arrangement does not affect the mechanical stability of its structure.

Figure 6:
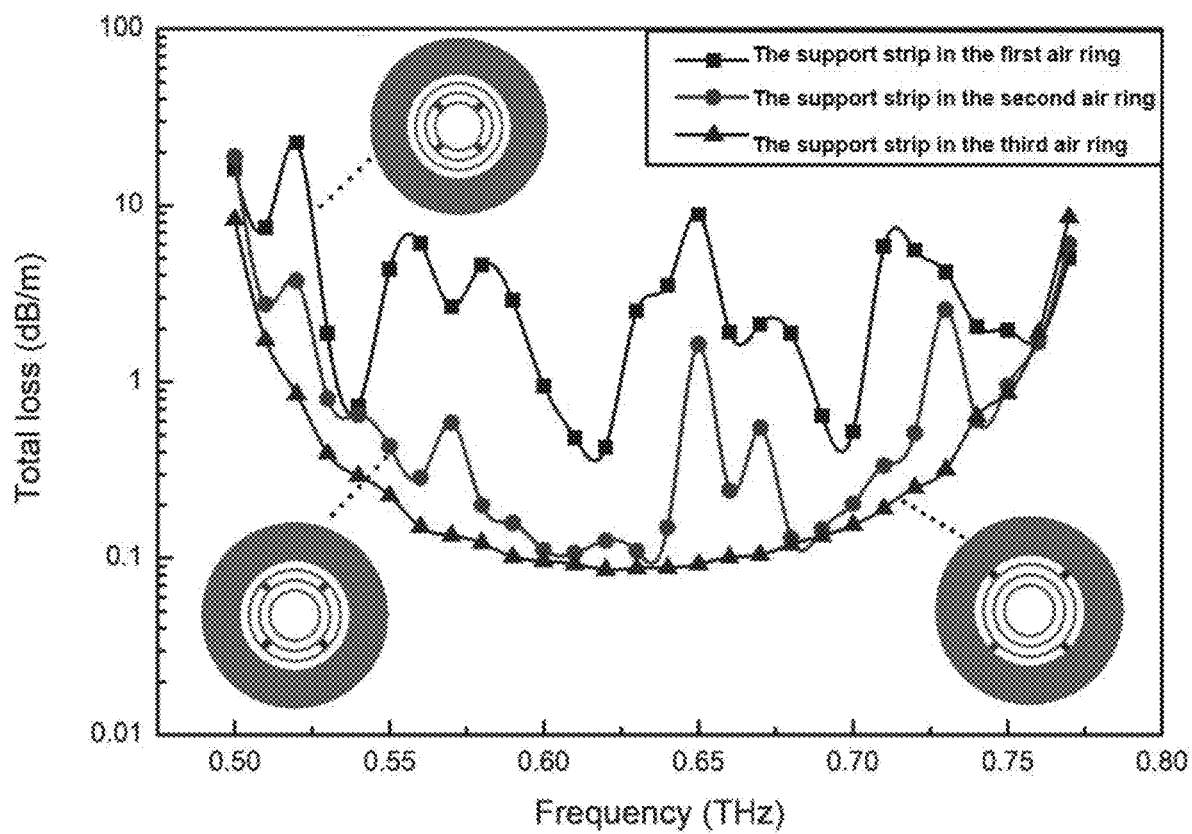
FIG. 6 is a confinement loss curve diagram of the support strips arranged in different air rings.

As shown in FIG. 6, the influence of the support strips 4 in the outer air rings on the modal loss decreases. Therefore, the loss of the whole waveguide structure is actually mainly comes from the waveguides units where the support strips 4 are arranged in the first and the second air rings 3, respectively. Since the two waveguide units only accounts for a part of the whole waveguide, therefore, the loss of the terahertz hollow core waveguide implemented by the present invention can be reduced. In addition, waveguide cross-section without support strips 4 can be formed in some waveguide regions, and the loss in this region is lower. Therefore, the terahertz hollow core waveguide implemented by the present invention not only has a lower loss for the single waveguide unit than that of the waveguide with traditional support structure, but also constructed a waveguide with a low transmission loss through the combination of different waveguide units, so as to reduce the impact of the support strips 4 on the mode loss and obtain losses lower than that of the traditional support structure.

Figure 5A:
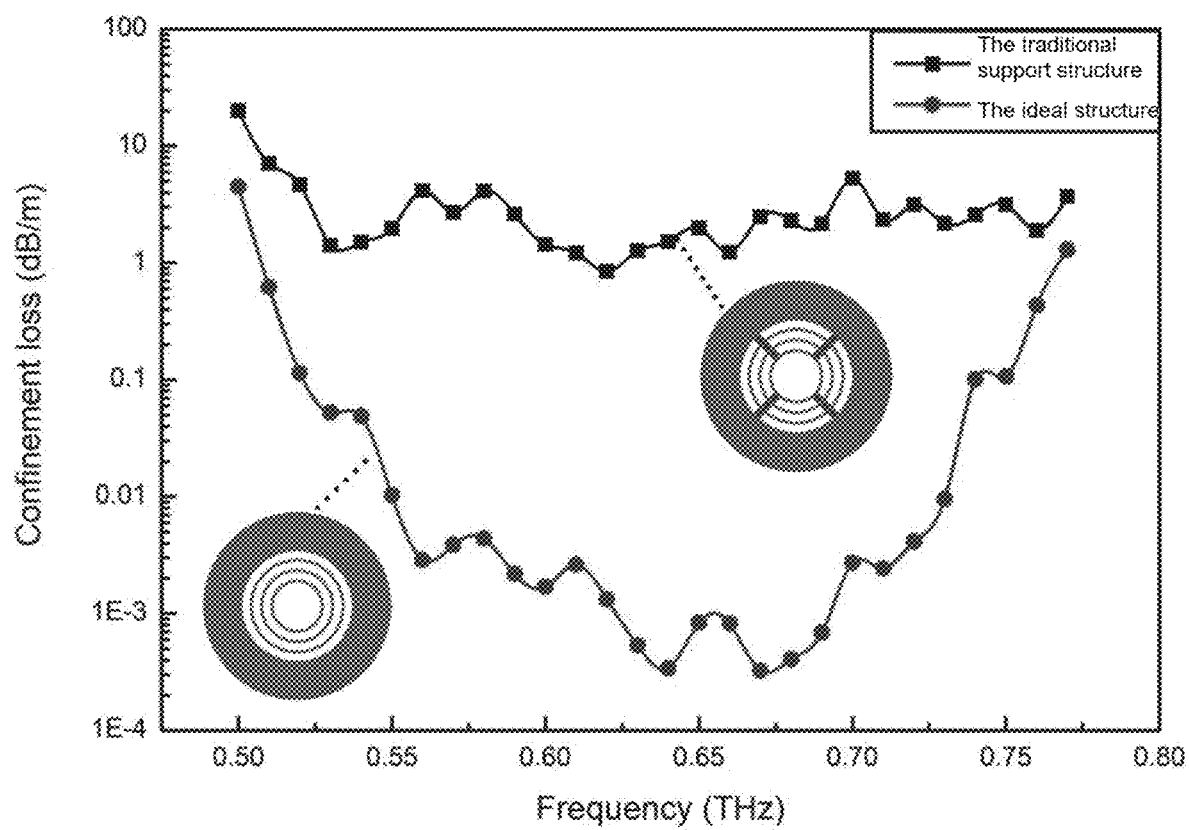
FIGS. 5A-5C are confinement loss curve diagrams for the hollow-core waveguides, where
Figure 5B:
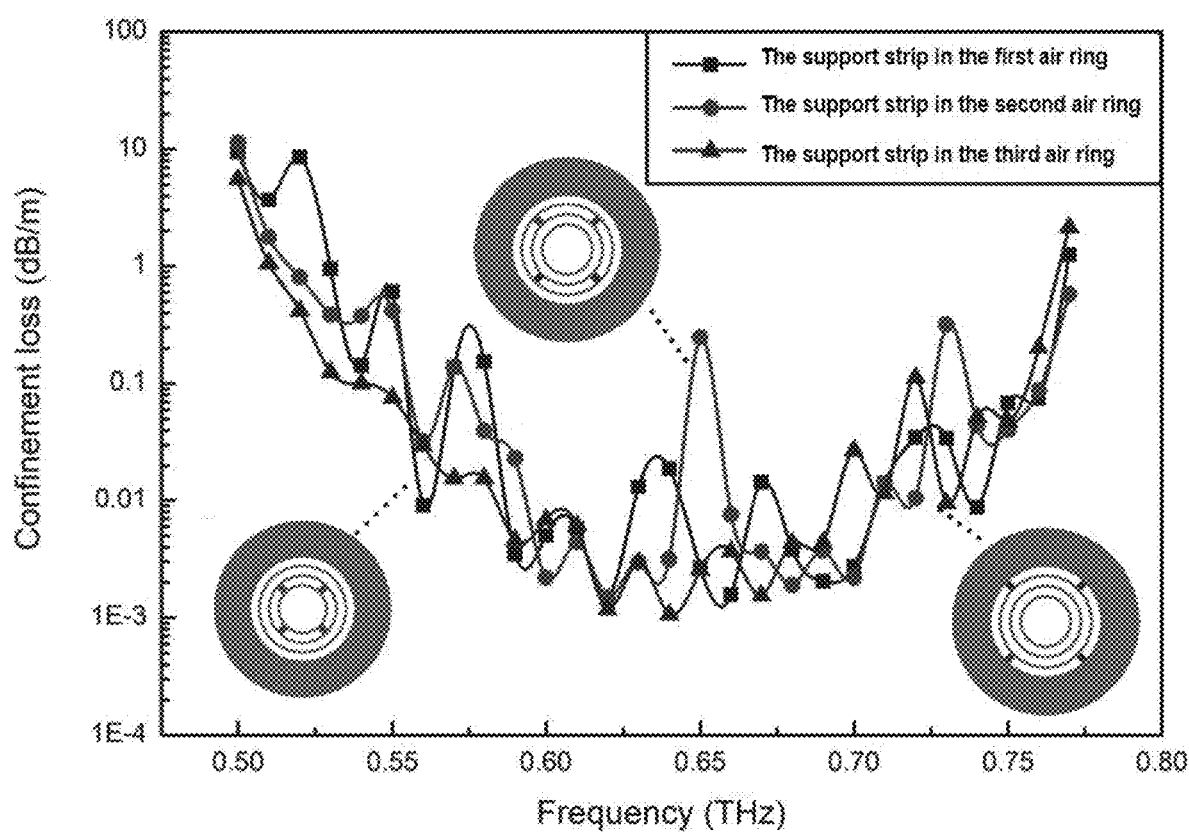
Figure 5C:
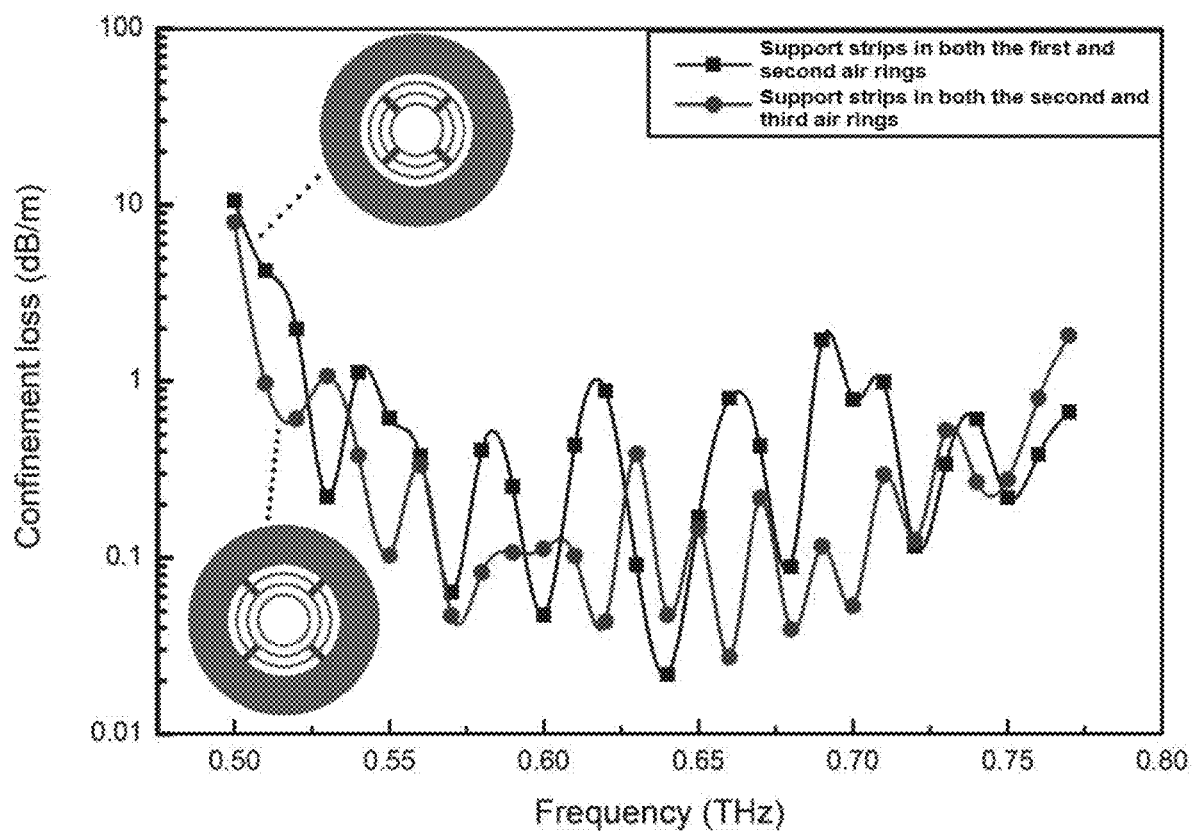

If the support strip 4 exists in all air rings 3 in the cross section of the waveguide, it will cause large confinement loss. In contrast, if the support strips only exist in one of air rings 3 in the waveguide unit as shown in FIGS. 5A-5C, waveguide unit has the advantage of low transmission loss. As can be seen from FIG. 5B, the support strip 4 in the inner air ring 3 has a great impact on the loss. The support strip 4 in the inner air ring 3 causes a large fluctuation of loss with wavelength, while the support strip 4 in the third air ring 3 causes a small fluctuation of loss. As can be seen from FIG. 5C, when there are support strips 4 in both the first and second air rings 3 or support strips 4 in both the second and third air rings 3 in the same cross section, the confinement losses are significantly higher than the condition where support strips exist in only a single air ring 3, which indicates that if there are support strips 4 in the two adjacent air rings 3, the confinement loss would be large. The reason is that the existence of the support strip destroys the band gap structure of the two cladding periods, and the energy will be coupled between the two dielectric rings. Therefore, when at most one of the two adjacent air rings 3 has the support strips 4 in the cross-section, the confinement loss caused by the support strip 4 can be more effectively reduced. As a more effective way, for each waveguide unit, at most one air ring exists a support strip group, that is, for any cross section of the waveguide, there is at most one air ring exists a support strip group. This setting reduces the energy coupling between different dielectric layers as much as possible, so that the waveguide would have low transmission loss.

Preferably, the widths of the support strip 4 in the same air rings 3 for any cross section of the terahertz hollow core waveguide are the same, and the support strips 4 are evenly arranged along the circumferential direction, that is, the angle between the two adjacent support strips 4 is $360°/M_n$, so as to ensure the degeneracy of the polarization state of the modes in core 1, that is, the shape of the support strips 4 should be the same, and the spacing between the adjacent support strips 4 should be the same. For the aim of mechanical support, the support strips 4 must be wide enough to achieve effective support, but at the same time, the too wide support strip 4 will also lead to the overall destruction of the waveguide band gap. Therefore, the width $d_{s,n}$ of the support strips 4 in the nth air ring 3 and the number $M_n$ of support strips 4 on the same cross section meet the requirements: $d_{s,n} \geq d_{m,n}$, and $M_n d_{s,n} < 2\pi d_{r,n}/4$, where $d_{m,n}$ is the width of the nth dielectric ring 5 and $d_{r,n}$ is the outer diameter of the nth dielectric ring 5.

Figure 7A:
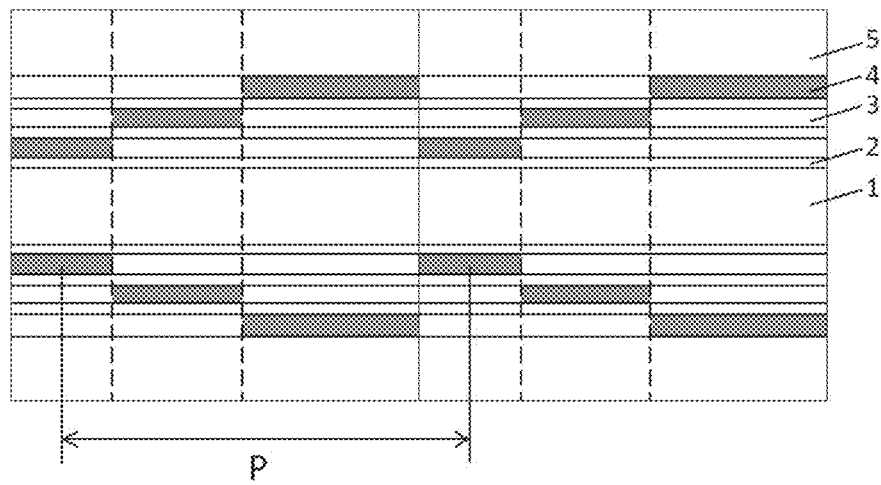
FIGS. 7A-7C are schematic diagrams of the arrangement of support strips with axial periodic arrangement, where
Figure 7B:
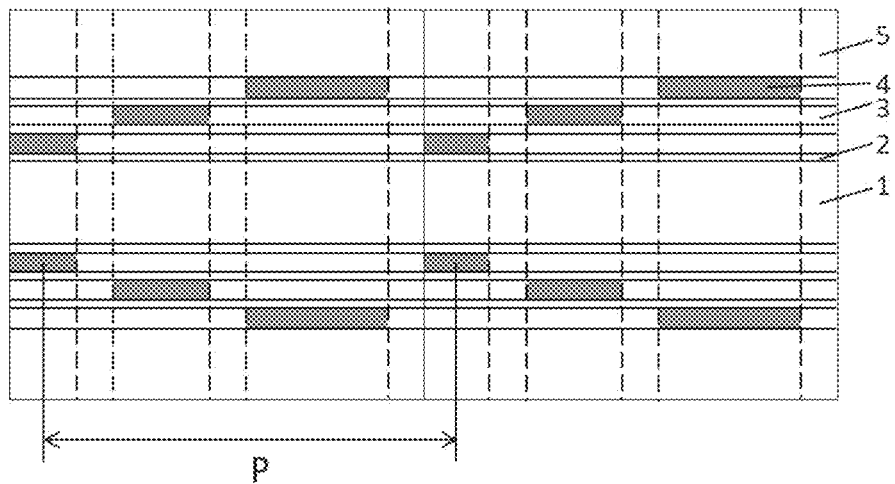
Figure 7C:
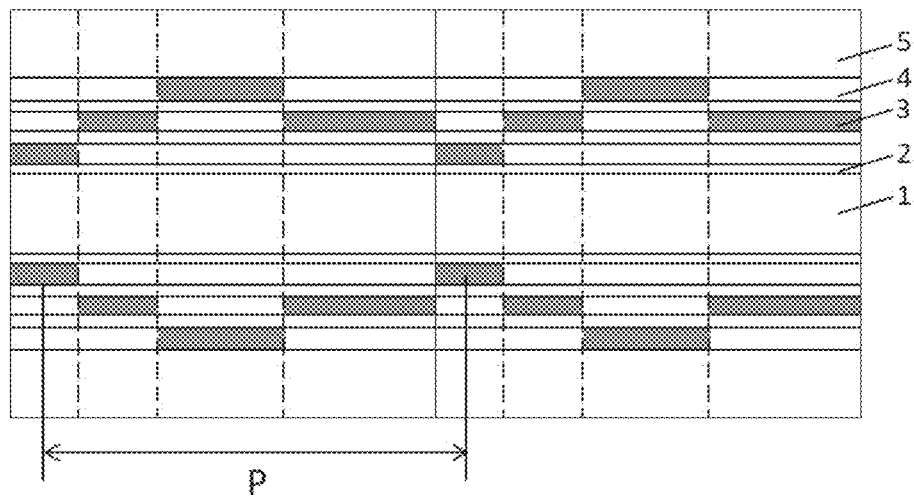

Preferably, the support strip groups are arranged periodically along the axial direction of the waveguide, as shown in FIGS. 7A-7C. As shown in FIG. 7A, the support strip groups are arranged periodically along the radial direction of the waveguide, and the support strip groups are successively arranged in the first air layer 3, the second air layer 3, the third air layer 3, etc, and until the (N−1)th air layer 3 and the Nth air layer 3. The whole terahertz waveguide is composed of multiple waveguide units in cascade, and each waveguide unit has at most one air ring provided with support strips 4. The above mentioned support strip groups in a period are arranged from the inner air ring to the outside air ring which ensures that a reasonable spacing is maintained for two axially adjacent support strips 4 in the same air ring along the axial direction of the waveguide, so as to realize the effective support of the dielectric ring 5.

Accordingly, in addition to the scheme that the support strip groups are arranged from inside to outside in the same cycle, according to the principle of mechanical structure, the support strip groups can also be arranged as shown in FIG. 7C, that is, the support strip groups are arranged in the first air ring 3, the second air ring 3, etc., and until the Nth air ring 3, and then arranged in the (N−1)th air ring 3, the (N−2)th air ring 3, etc., and finally the second air ring 3. Such periodic arch arrangement of the support strips can achieve stable mechanical support and ensure the stability of the structure under the external surrounding stress. In addition, a waveguide region without support strips 4 as shown in FIG. 7B can also be included, which ensures lower transmission loss. The periodically arranged support strips 4 can stably, support the dielectric rings 5 and the outer cladding 2, and effectively reduce the transmission loss caused by support strips 4. The number and length of the unit periods, and the length of the support strip 4 in each air ring 3 can be flexibly set according to the total length and practical requirements of the whole waveguide.

Figure 8A:
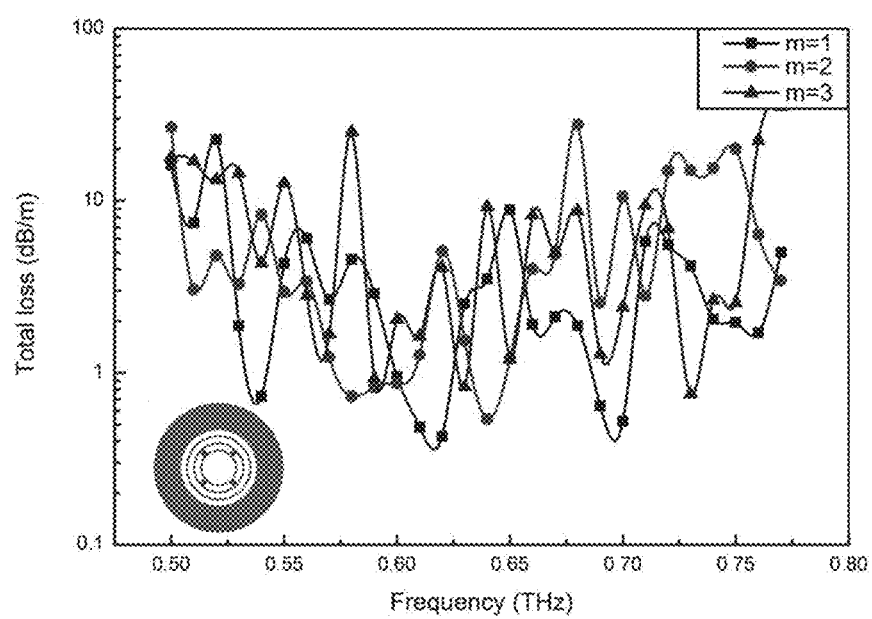
FIGS. 8A-8C show the transmission curves with different support strip numbers, where
Figure 8B:
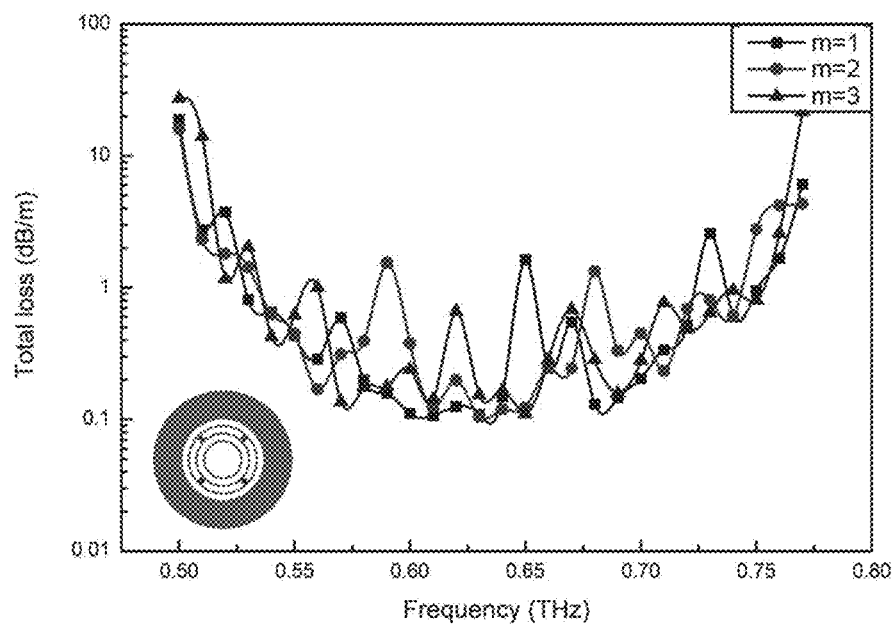
Figure 8C:
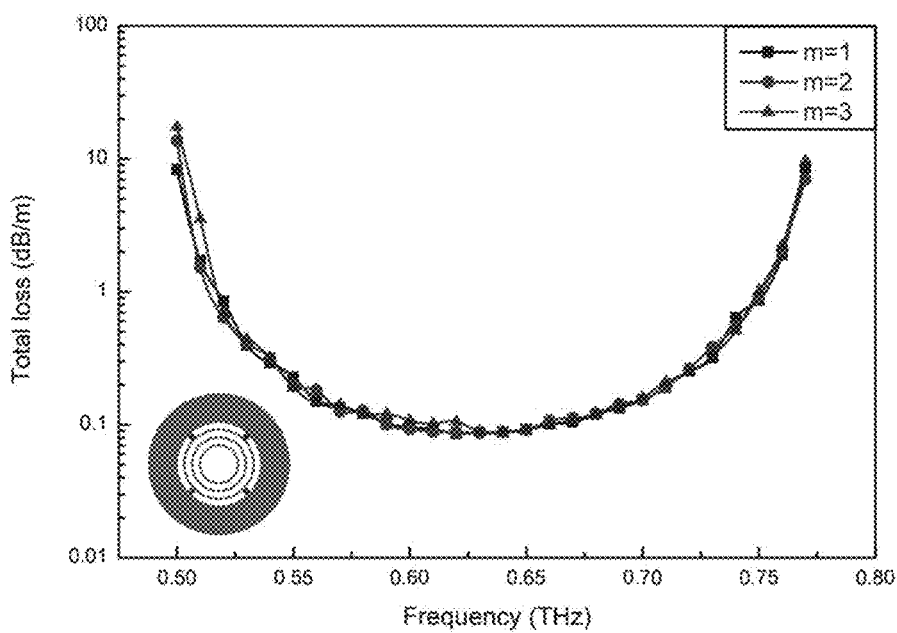

For the support strips 4 in the air ring 3 close to the outer cladding 2, the number of support strips has the least impact on the transmission loss as shown in FIGS. 8A-8C. For the air ring close to the core, the impact of the number of support strips 4 on the transmission loss increases. Therefore, it is preferred that the outer air ring adopts multiple thin and long support strips to achieve stable support and low transmission loss, while the inner air ring adopts shorter support strips.

Considering the influence of different air ring 3 on the transmission loss, the length $L_s$ of the support strip 4 in the first air ring 3 should be as short as possible. In particular, it is generally required that the period length $L_P$ of the support strips 4 and the length $L_s$ of the support strip 4 in the first air ring 3 should meet the condition of $L_s < 0.1P$. For a waveguide unit, when the length $L_{s,n}$ of the support strip 4 in the nth air ring 3 meets the condition of $d_{a,n} < L_{s,n} < 100 d_{m,n}$, the mechanical support effect is better, where $d_{m,n}$ is the width of the nth dielectric ring 5 and $d_{a,n}$ is the width of the nth air ring 3.

The basic structures and parameters of an embodiment of the present invention are listed below. The diameter of core 1 is D=5 mm, the width of the air rings 3 is $d_a$=0.774 mm, the width of the high-index dielectric rings 5 is $d_m$=0.315 mm, and the number of the dielectric rings 5 is N=3. From the center to the outside, the width of the support strips 4 on the air ring 3 is $d_{s,1}$=0.387 mm, $d_{s,2}$=0.774 mm, $d_{s,3}$=0.323 mm, respectively, the numbers of support strips 4 on the air rings 3 are $N_1$=1, $N_2$=2, $N_3$=2, respectively. $W_1$, $W_2$, $W_3$ represent, respectively, the waveguide units with support strips in the first, second, and the third air rings 3. The length of the period of the waveguide is P=10 mm, and the lengths of $W_1$, $W_2$, $W_3$ are $L_{s,1}$=0.8 mm, $L_{s,2}$=3.2 mm, $L_{s,3}$=6 mm, respectively. That is, if the waveguide length is setting as 30 mm, then its waveguide unit connecting order would be $W_1$, $W_2$, $W_3$, $W_1$, $W_2$, $W_3$, $W_1$, $W_2$, $W_3$. The terahertz hollow core waveguide structure of this embodiment can achieve low transmission losses of less than 0.3 dB/m, which is closer to the result of an ideal waveguide without support strips. Therefore, the appropriate chosen of width, number, and the arrangement method of the support strips 4 according to the support strip arrangement of the present invention, can lead to the achievement of terahertz hollow core waveguides with low transmission loss.

In the description of this specification, a description of the reference terms "one embodiment," "some embodiments," "examples," "specific examples," or "some examples" and the like means that specific features, structures, materials, or features described in connection with the embodiments or examples are included in at least one embodiment or example of the present invention. In this specification, a schematic description of the above terms does not necessarily refer to the same embodiment or example. Moreover, the specific features, structures, materials or features described may be combined in an appropriate manner in any one or more embodiments or examples.

Although the embodiments of the present invention have been shown and described above, it can be understood that the above embodiments are illustrative and cannot be understood as a limitation of the present invention. A technician in the art can change, modify, replace and modify the above-mentioned embodiments within the scope of the present invention without departing from the principle and purpose of the present invention.

What is claimed is:

1. A terahertz hollow core waveguide, comprising cascaded waveguide units, wherein each of the waveguide units comprises a core and a cladding;
    wherein the core is composed of air, the cladding comprises dielectric rings, air rings, an outer cladding, and one or more support strip groups, wherein the dielectric rings and the air rings are alternately arranged around the core, and the outer cladding is arranged on an outside of an outermost air ring,
    wherein at least one support strip group is provided in each air ring of the terahertz hollow core waveguide, wherein all support strips in an air ring of a waveguide unit form a support strip group, and the support strips in a support strip group are arranged along a circumferential direction to connect two adjacent dielectric rings in the waveguide unit or to connect an outermost dielectric ring and the outer cladding in the waveguide unit, wherein for any two adjacent waveguide units, at least one of the waveguide units does not have support strips in at least one of the air rings.

2. The terahertz hollow core waveguide according to claim 1, wherein the air rings, the dielectric rings and the outer cladding are concentric rings, all the air rings have a same width, and all the dielectric rings have a same width.

3. The terahertz hollow core waveguide according to claim 1, wherein for arbitrarily two adjacent air rings in the waveguide unit, at most one air ring is provided with a support strip group.

4. The terahertz hollow core waveguide according to claim 1, wherein a number of dielectric rings N meets a condition of $2 \leq N \leq b$.

5. The terahertz hollow core waveguide according to claim 1, wherein a width $d_{s,n}$ of a support strip in an nth air ring meets conditions of $d_{s,n} \geq d_{m,m}$, $M_n d_{s,n} < 2\pi d_{r,n}/4$, and $1 \leq M_n \leq N$, wherein n denotes an order number of air ring from inside to outside along a radial direction of the waveguide, $M_n$ denotes a number of support strips located on a same cross section of the waveguide, $d_{m,n}$ is a width of the dielectric ring in an nth ring, $d_{r,n}$ is an outer diameter of the nth dielectric ring and N denotes a number of dielectric rims.

6. The terahertz hollow core waveguide according to claim 1, wherein each waveguide unit has at most one air ring provided with a support strip group.

7. The terahertz hollow core waveguide according to claim 1, wherein the support strip groups are periodically arranged along the axial direction of the waveguide, for each period, the support strip groups are arranged in order, firstly in a first air ring, then in a second air ring, etc., and until up to an N-th air ring, wherein an air ring adjacent to the core is denoted as the first air ring and the other air rings are named according to an order of the air rings arranged radially along the waveguide, wherein N is a number of air rings.

8. The terahertz hollow core waveguide according to claim 1, wherein the support strip groups are periodically arranged along an axial direction of the waveguide, and the support strip groups in a period are successively arranged in order, firstly in a first air ring, then in a second air ring, etc., and until up to an Nth air ring, and then arranged in order from an (N−1)-th air ring and until up to the second air ring, wherein an air ring adjacent to the core is denoted as the first air ring and the other air rings are named according to an order of the air rings arranged radially along the waveguide, wherein N is a number of air rings.

9. The terahertz hollow core waveguide according to claim 3, wherein the support strips in a same air ring are evenly distributed along the circumferential direction in the waveguide unit.

10. The terahertz hollow core waveguide according to claim 9, wherein lengths $K_{s,n}$ of the support strips in an nth air ring in a waveguide unit meet a condition of $d_{a,n} < L_{s,n} < 100 d_{m,n}$ wherein $d_{m,n}$ is a width of an nth dielectric ring and $d_{a,n}$ is a width of an nth air ring.

* * * * *